(No Model.) 2 Sheets—Sheet 1.

T. B. CLARK.
BROADCAST HAND SEED SOWER.

No. 275,590. Patented Apr. 10, 1883.

Attest:
T. Walter Fowler
Wm. A. Schoenborn

Inventor
Tobias B. Clark
per Atty
A. H. Evans & Co (No Model.) 2 Sheets—Sheet 2.

T. B. CLARK.
BROADCAST HAND SEED SOWER.

No. 275,590. Patented Apr. 10, 1883.

Attest:
T. Walter Fowler
Wm. A. Schoenborn

Inventor:
Tolivar B. Clark
per Attys.
A. H. Evans & Co.

UNITED STATES PATENT OFFICE.

TOLIVAR B. CLARK, OF NORTH MANCHESTER, INDIANA.

BROADCAST HAND SEED-SOWER.

SPECIFICATION forming part of Letters Patent No. 275,590, dated April 10, 1883.

Application filed December 29, 1882. (No model.)

*To all whom it may concern:*

Be it known that I, TOLIVAR B. CLARK, of North Manchester, in the county of Wabash and State of Indiana, have invented certain Improvements in Broadcast Hand Seed-Sowers; and I hereby declare the following to be a full, clear, and exact description thereof, reference being had to the accompanying drawings, making part of this specification, in which—

Figure 1:
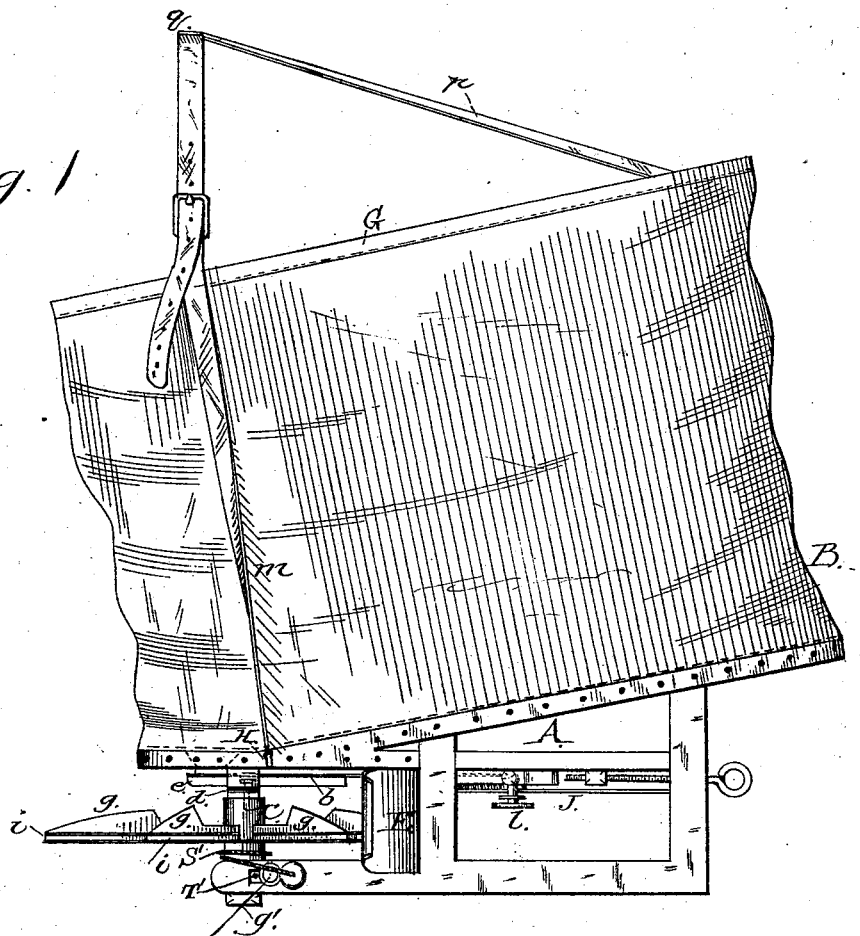
Figure 4:
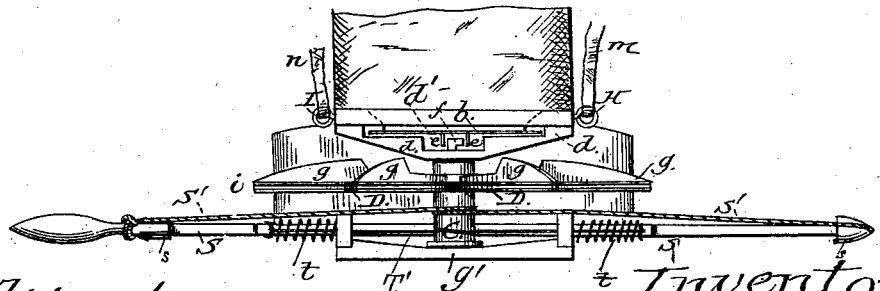
Figure 2:
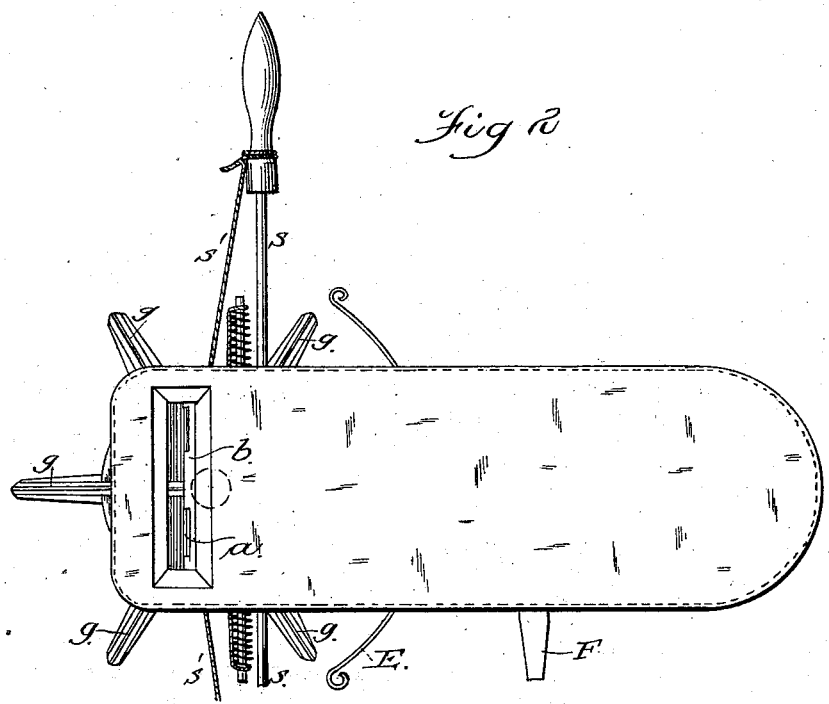
Figure 3:
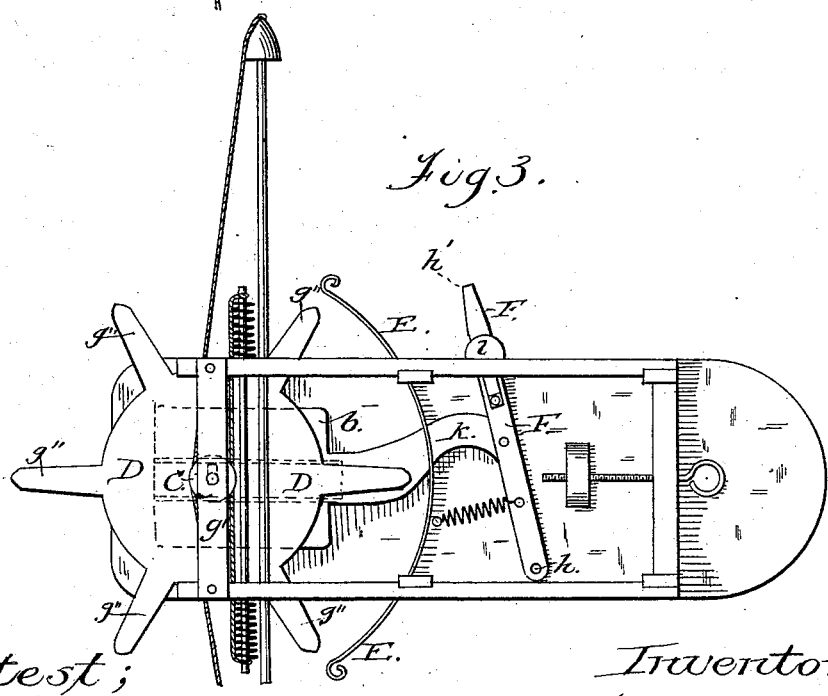

Figure 1 is a side elevation of the sower. Fig. 2 is a plan view, with the grain-holding bag removed and the feed-slide open. Fig. 3 is a bottom plan view. Fig. 4 is an end view.

My invention relates to that class of broadcast hand-sowers wherein a wheel-distributer provided with wings is vibrated on a vertical journal in the line of a feed of falling grain and scatters said grain.

Heretofore all seeders of this class have been constructed with the feed-opening in the rear of the center of vibration and to the rear of the eccentric and axle, whereby the grain is not thrown to a sufficient degree forward of the operator and is made to fall in streaks.

The object of my invention is to correct this and other faults in this class of machines; and my invention consists, first, in a hand broadcast-sower provided with a feed-opening which drops the grain upon the distributing-wheel in a line forward of the center of vibration; second, in a wheel distributer having a flat bottom, in contradistinction to the disk-shaped distributers heretofore used; third, in horizontal flanges projecting from the sides of the vertical wings on the distributer; fourth, in a combination of devices which sets and retains the throat or feed-plate; fifth, in a seeder provided with a novel carrying-strap, whereby the load is more evenly distributed and the device steadied.

My invention further consists in sundry details of construction, as hereinafter set forth.

In order that those skilled in the art may make and use my invention, I will proceed to describe the manner in which I have carried it out.

In the said drawings, A is the bottom to the grain-holder B, provided with the usual transverse opening, $a$, for feeding the grain to the distributer-plate. This transverse opening $a$ is forward of a central line drawn through center of vibration of the distributer, or through the spindle on which the distributer turns, and is provided with a sliding vibrating door, $b$, which closes said opening by moving against the lower face of the bottom A, and is sustained by a yoke, $d$, passing across the bottom A, and provided at its center with a depression, $d'$, through which moves two parallel longitudinal fins or webs, $ee$, between which the vibrating cam $f$ rests.

Journaled in a cross-bar, $g'$, and in yoke $d$ is the spindle or hub C, carrying a flat distributer-plate, D, provided with a series of vertical radial wings, $gg$, which scatter the falling grain. Projecting at right angles from these wings are a series of narrow plates, $ii$, which lie in a plane parallel to the plane of the distributer-plate D, and materially aid, as I have found by actual experiment, in equally scattering the grain. A curved shield, E, supported in the frame-work, lies immediately in the rear of the distributer.

A tongue, $k$, on the vibrating sliding door $b$ extends rearwardly and is pivoted to the center of a lever, F, one end of which is pivoted at $h$ on the lower face of bottom A, and the other end, $h'$, passes through the frame beneath a rod, J, and has a clamp and set-screw, $l$, adapted to hold the lever in any desired position when said lever has retracted gate or door $b$ to such an extent as to leave a desirable size of opening for the escape of grain.

In order to facilitate the carrying of the device when loaded with grain, I provide an arrangement of straps, as follows: To the top of the support G, designed to sustain the grain-receptacle, is permanently fixed the end of a strap, $m$, which passes through an eye, H, and has on its end a buckle which incloses the main strap $m$, there being proper holes for the tongue of the buckle, whereby the length of strap $m$ may be lengthened or shortened. From a ring or eye, I, opposite to eye H, passes another strap, $n$, which has a fastening to the upper end of the grain-holder, and its end furnished with a buckle. A branch strap, $p$, is secured to strap $n$ at $q$, and then engages with the buckle. This arrangement of straps is of especial value in this device. The operator slings straps $pn$ over his left shoulder, straps $m$ and $n$ (up to the point $q$) being in front of his left arm. This arm can thus be bent and the elbow thrown back, when the hand will be in exact position for operating retracting-lever F. The strap $m$ is stitched to support G where it passes it, and strap $p$ is also connected directly with said support. Strap $n$, however, is not so stitched. This arrangement enables me to adjust the length of the sling to the size desired, and yet support the grain-holder B in an upright manner, thus avoiding the spilling of the seed.

I am aware that strap-slings for supporting seed-sowers are old, neither do I claim, broadly, as my invention such slings; but I confine myself to the precise construction herein described, which I consider of great advantage in connection with the device. By means of these straps the machine is steadied, and the back-and-forth movement of the rod and cord S S', which turns the distributer-plate in the usual way, is facilitated. Immediately in front, however, of this rod and cord S S', I provide another rod and cord, T T', held in place in a central position by coiled springs $t\,t$, one upon each end of the rod, their inner ends bearing against the frame-work of the machine, and their outer against the cord where it is fastened to the rod. The rod S is provided with enlargements or knobs $s\,s$ upon its ends, and these knobs at every stroke come in contact alternately with the ends of rod T and force them toward the center. Cord T' is wound around hub C in the opposite direction from cord S'. Consequently when rod T is moved its cord T' acts as a brake and stops the motion of rod S with a gentle force. This prevents the injury to the machine and the disagreeable and wearying effect upon the operator which a sudden stop and consequent jar or shock at each stroke would produce.

Having thus described my invention, what I claim as new, and desire to secure by Letters Patent, is—

1. A broadcast hand seed-planter having a distributer-plate, D, for scattering the grain, in combination with a grain-feeding device which is adapted to drop the grain on the distributer-plate forward of the center of vibration, for the purpose specified.

2. In a broadcast hand seed-sower, the supplemental rod and cord T T', in combination with rod and cord S S', knobs $s\,s$, and hub C, cords S' and T' being wound around said hub in opposite directions, as and for the purpose specified.

3. In a broadcast hand seed-sower, the flat distributer-plate D, with arms $g''\,g''$ and vertical plate-wings $g\,g$, extending longitudinally throughout the length of said arms $g''\,g''$, in combination with supplementary horizontal arms $i\,i$, a little above and parallel with arms $g''\,g''$, and at right angles to and extending from both sides of wings $g\,g$, all operating as and for the purpose described.

4. In combination with the broadcast hand-sower, the duplex carrying-strap consisting of the straps $m\,n\,p$, with their fastenings and buckles, as described.

TOLIVAR B. CLARK.

Witnesses:
JOHN A. BARSH,
W. D. KEESEY.